United States Patent [19]

Dumoulin et al.

[11] 4,028,298

[45] June 7, 1977

[54] ORGANOSILICON COMPOSITIONS PARTICULARLY SUITABLE FOR THE NON-STICK, RUB-RESISTANT TREATMENT OF CELLULOSIC AND SYNTHETIC MATERIALS

[75] Inventors: Jean Dumoulin, Ste Croix-en-Jarex; Parasko Nicou, Francheville-le-Haut, both of France

[73] Assignee: Rhone-Poulenc Industries, Paris, France

[22] Filed: Aug. 29, 1975

[21] Appl. No.: 608,977

[30] Foreign Application Priority Data

July 17, 1975 France .............................. 75.22336

[52] U.S. Cl. .................. 260/29.1 SB; 260/825; 428/457
[51] Int. Cl.² ............................. C08L 43/04
[58] Field of Search ................. 260/29.1 SB

[56] References Cited

UNITED STATES PATENTS

| | | | |
|---|---|---|---|
| 3,522,327 | 7/1970 | Parasko | 260/825 |
| 3,671,480 | 6/1972 | Wada et al. | 260/29.1 SB |
| 3,696,068 | 10/1972 | Creamer | 260/29.1 SB |

Primary Examiner—Harry Wong, Jr.
Attorney, Agent, or Firm—Stevens, Davis, Miller & Mosher

[57] ABSTRACT

Storage-stable organosilicon compositions are provided which are characterized in that, apart from 100 parts by weight of a diorganopolysiloxane polymer mixture and 1 to 15 parts by weight of an organohydrogenopolysiloxane polymer, they contain 0.001 to 0.1 part by weight of platinum in the form of a complex of the formula:

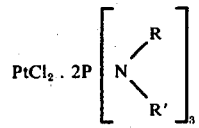

in which the symbols R and R', which may be identical or differen, each represents a monovalent hydrocarbon radical having from 1 to 8 carbon atoms, or two of these radicals, together with the nitrogen atom to which they are attached, form a monovalent heterocyclic radical.

8 Claims, No Drawings

ORGANOSILICON COMPOSITIONS PARTICULARLY SUITABLE FOR THE NON-STICK, RUB-RESISTANT TREATMENT OF CELLULOSIC AND SYNTHETIC MATERIALS

The present invention relates to organosilicon compositions which are particularly suitable for coating sheet-like cellulosic or synthetic materials for imparting after deposition of thin layers, and curing, a high degree of non-stick character, which resists repeated rubbing.

Numerous coating compositions have already been proposed for rendering a great variety of supports, such as different types of paper, and plastic sheets and films, non-stick towards tacky or viscous substances. These compositions consist, for the most part, of organopolysiloxane polymers having SiOH groups, organopolysiloxane polymers having SiH groups and, as catalysts, derivatives of tin (see for example, French Patents Nos. 1,226,745, 1,474,577, 1,492,531, 1,556,008, 1,572,724 and 1,595,718). However, such catalysts prevent the compositions from being stable at ambient temperature. Thus, after a few hours, they begin to thicken and then change entirely to a gelatinous material. As a result, very frequently a not insignificant part of the treatment baths consisting of, or containing, these compositions is lost; for example, the bottom parts of the baths, which the coating rollers cannot reach, are generally not mixed with the freshly prepared baths and it is more economical to remove them and destroy them rather than risk rendering the fresh baths unusable.

Recently (see French Application No. 2,183,125) it has been proposed to increase the stability of such coating compositions by replacing the tin derivatives by certain complexes of platinum halides. These complexes make it possible effectively to slow down the thickening and gelling processes, but this slowing-down is insufficient and, in effect, does not avoid the compositions gelling over 48 hours or more at a temperature which may reach 50° C.

The present invention relates to compositions which possess greater storage stability; this invention provides organosilicon compositions which contain the following ingredients (throughout this specification the parts and percentages are expressed by weight):

A. 100 parts of a polymer mixture which is either: (i) a mixture containing 60 to 100% of a diorganopolysiloxane polymer (a) with terminal hydroxyl groups, of viscosity at least 10 cPo at 25° C, and 40 to 0% of a diorganopolysiloxane oil (b) blocked at one of the chain ends by a triorganosiloxyl unit and at the other end by a triorganosiloxyl unit or a hydroxyl group, of viscosity from 5 to 500 cPo at 25° C, or ii. a mixture containing 30 to 90% of the above diorganopolysiloxane polymer (a) and 70 to 10% of diorganopolysiloxane rubber (c) blocked at each chain end by triorganosiloxyl units, of viscosity at least 1 million cPo at 25° C, the organic radicals linked to the silicon atoms of the diorganopolysiloxanes described under (i) and (ii) being methyl, vinyl, ethyl or n-propyl radicals such that at least 80% of these radicals are methyl radicals, at most 3% of these radicals are vinyl radicals and such that there is only a single vinyl radical linked to a silicon atom.

B. 1 to 15 parts of an organohydrogenopolysiloxane polymer (d) corresponding to the general formula:

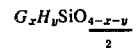

in which the symbol G represents a methyl, ethyl, or n-propyl radical such that at least 80% of the radicals G are methyl radicals, the symbol $x$ represents any number from 1 to 1.99 and the symbol $y$ represents any number from 0.1 to 1 with the sum $x + y$ being from 1.7 to 2.6, the viscosity being from 2 to 4,000 cPo at 25° C.

C. 0.001 to 0.1 part of platinum in the form of a complex of platinous chloride with phosphorus derivatives. This complex corresponds to the general formula:

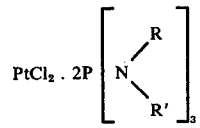

in which the symbols R and R', which may be identical or different, represent monovalent hydrocarbon radicals having from 1 to 8 carbon atoms, or two of these radicals together form a monovalent heterocyclic radical with the nitrogen atom to which they are attached.

The diorganopolysiloxane polymers (a) are mobile oils of viscosity ranging, for example, from 19 to 3,000 cPo at 25° C, viscous oils of viscosity from 3,000 cPo to 1 million cPo at 25° C, or rubbers of higher viscosity which can exceed 80 million cPo at 25° C. These polymers essentially consist of units of the formula $G'_2SiO$ in which $G'$ is as defined above but the presence of units of the formulae $SiO_2$ and $G'SiO_{1.5}$ is not excluded, provided they amount to say, at most 1% of the number of $G'_2SiO$ units.

By way of illustration, units having the following formulae: $(CH_3)_2SiO$, $CH_3(CH_2=CH)SiO$, $CH_3(C_2H_5)SiO$, $CH_3(n.C_3H_7)SiO$, $(C_2H_5)_2SiO$, $(n.C_3H_7)_2SiO$ and $C_2H_5(n.C_3H_7)SiO$ may be mentioned as specific units derived from the general formula $G'_2SiO$. The hydroxylic dimethylpolysiloxanes are used preferentially as polymers (a).

The polymers (a) are marketed by the manufacturers of silicones and their techniques of manufacture are well-known. One of the commonest techniques consists of polymerising, in a first stage, diorganocyclopolysiloxanes using catalytic amounts of alkaline or acid agents and then treating the polymers obtained with the calculated amounts of water (see, for example French Patents Nos. 1,134,005, 1,198,749 and 1,226,745), the amounts of water introduced being the higher the lower is the viscosity of the polymers which are to be prepared. Thereafter, in a second stage, the polymers are isolated by removing, at a temperature generally above 100° C and under a pressure preferably below atmospheric pressure, the diorganocyclopolysiloxane starting materials present in the reaction mixture as well as the other low molecular weight polymers formed during this reaction. It is advisable to neutralize the alkaline or acid agents used as polymerisation catalysts before distilling the volatile products.

All the volatile polymers together amount to a varying percentage relative to the weight of the polymerisation products (that is to say the polymers of viscosity of at least 10 cPo at 25° C plus the volatile polymers); this percentage usually does not exceed 25% in the case of the manufacture of rubbers. In the case of the manufacture of less viscous products, this percentage is markedly lower and can drop to 10%.

If the rubbers are prepared in accordance with the above technique they can subsequently be used without isolation, that is to say as a mixture with the volatile polymers. In this form they frequently mix more easily with the other ingredients of the compositions.

The diorganopolysiloxane oils (b) have a low viscosity, ranging from 5 to 500 cPo at 25° C, preferably from 8 to 300 cPo at 25° C; they also consist of units of the general formula G'$_2$SiO (the symbol G' having the abovementioned meaning), amongst which the presence of units of the formula SiO$_2$ and G'SiO$_{1.5}$ is not excluded provided they amount to, say, at most 1% of the number of G'$_2$SiO units. They can be blocked at each end of their chain by triorganosiloxyl units (of the formula G'$_3$SiO$_{0.5}$) or blocked only at one of the ends by a triorganosiloxyl unit and at the other end by a hydroxyl group. The oils (b) preferably used are those which carry essentially methyl radicals.

The oils blocked at each end of their chain by triorganosiloxyl units are manufactured on an industrial scale; they can be prepared in accordance with the method described for the manufacture of the diorganopolysiloxane polymers (a), provided the calculated amounts of water are replaced by the calculated amounts of diorganopolysiloxanes (e) of low molecular weight, having the ends of their chain blocked by G'$_3$SiO$_{0.5}$ units. The diorganopolysiloxanes (e) are typically those corresponding to the following specific formulae:
(CH$_3$)$_3$SiOSi(CH$_3$)$_3$, C$_2$H$_5$(CH$_3$)$_2$SiOSi(CH$_3$)$_2$C$_2$H$_5$, CH$_2$=CH(CH$_3$)$_2$SiOSi(CH$_3$)$_2$OSi(CH$_3$)$_2$ CH=CH, (CH$_3$)$_3$SiOSi(CH=CH$_2$)(CH$_3$)$_2$, n.C$_3$N$_7$(CH$_3$)$_2$SiOSi(CH$_3$)$_2$ n.C$_3$H$_7$ and (CH$_3$)$_2$(CH$_2$=CH)Si[OSi(CH$_3$)$_2$.]$_v$OSi(CH=CH$_2$)(CH$_3$)$_2$, with the symbol $v$ representing any number not exceeding 40.

The oils (b) blocked at one of the ends of their chain by a triorganosiloxyl unit and at the other end by a hydroxyl group can be prepared by this method, but in this case it is necessary to introduce both water and diorganopolysiloxanes (e) of low molecular weight, the molar ratio water/diorganopolysiloxane (e) being calculated so as to impart the desired viscosity to the oils (b) and to give a molar ratio SiOH/G'$_3$SiO$_{0.5}$ essentially equal to one.

Other methods, as indicated in French Patent No. 1,370,884 for example, can also be used; thus, diorganopolysiloxane polymers (a) possessing hydroxyl groups and having a viscosity less than 500 cPo at 25° C can be reacted with silanes of the formula G'$_3$SiCl in the presence of, for example, a tertiary amine as acid acceptor, the molar ratio of the two reactants present being calculated on the basis of 2 mols of SiOH group per mol of the silanes.

The diorganopolysiloxane rubbers (c) are polymers of viscosity at least 1 million cPo at 25° C; their viscosity can exceed 80 million cPo at 25° C; their structure is similar to that of the diorganopolysiloxane oils (b) blocked at each end of their chain by triorganosiloxyl units, and they differ from the oils by the number of G'$_2$SiO units which they contain, which can be as high as 50,000 whilst the number is approximately from 10 to 250 in the case of the oils (b). Preferably, the rubbers (c) used are dimethylpolysiloxane rubbers blocked at each end of their chain by (CH$_3$)$_3$SiO$_{0.5}$ or (CH$_3$)$_2$CH$_2$=CHSiO$_{0.5}$ units.

These rubbers are manufactured on an industrial scale and can be prepared in accordance with the process indicated for the oils (b) which are blocked by triorganosiloxyl units, except that the amounts of diorganopolysiloxanes (e) added are lower.

The organohydrogenopolysiloxane polymers (d) used in an amount of 1 to 15 parts, preferably 2 to 10 parts, per 100 parts of the polymers (A), correspond, as indicated above, to the average general formula

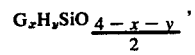

in which G has the significance already indicated, the symbol $x$ represents any number ranging from 1 to 1.99, preferably 1.05 to 1.95, the symbol $y$ represents any number ranging from 0.1 to 1, preferably 0.2 to 0.95, and the sum $x + y$ ranging from 1.7 to 2.6, preferably 1.80 to 2.55. Methylhydrogenopolysiloxanes are preferably used as the organohydrogenopolysiloxanes (d).

The organohydrogenopolysiloxanes (d) are available amongst marketed silicones; the techniques for their preparation are now well developed. One of the techniques most used consists, in a first stage, of co-hydrolysing suitable mixtures consisting of chlorosilanes such as G$_3$SiCl, G$_2$SiCl$_2$, GSiCl$_3$, SiCl$_4$, HG$_2$SiCl, HGSiCl$_2$ and HSiCl$_3$. Suitable mixtures include mixtures which each contain a number of radicals G per atom of silicon, and a number of hydrogen radicals per atom of silicon, which respectively coincide with the values represented by the symbols $x$ and $y$ of the average general formula, with the proviso that the sum of these numbers must also coincide with the permitted values for the sum $x + y$.

In a second stage, the cohydrolysates are heated to a temperature from 80 to 220° C, preferably in the presence of acid reagents such as sulphuric acid and acid-activted earths. During this heating, a rearrangement of the siloxane bonds as well as a condensation of the SiOH groups occurs. These conversions give organohydrogenopolysiloxane polymers (d) which thus have linear, cyclic or branched structures depending on the chlorosilane starting mixtures.

Amongst the linear polymers there may be mentioned, by way of illustration, those corresponding to the following formulae:

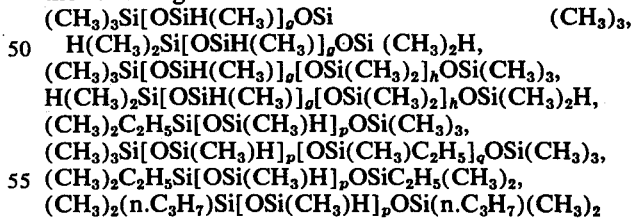

in which the symbol $g$ represents any number from 3 to 90, $h$ represents any number from 1 to 30, $p$ represents any number from 6 to 60, $p'$ represents any number from 1 to 5, $q$ represents any number from 1 to 4 and $q'$ represents any number from 7 to 20. These linear polymers generally have a rather low viscosity, for example from 5 to 250 cPo at 25° C.

Amongst the cyclic polymers there may be mentioned, by way of illustration, those corresponding to the following formulae: [OSi(CH$_3$)H]$_4$, [OSi(CH$_3$)H]$_5$,

[OSi(CH$_3$)H]$_6$, [OSi(CH$_3$)H]$_3$ and [OSi(C$_2$H$_5$)CH$_3$]. The branched polymers each consist of a combination of units such as those of the formulae G$_3$SiO$_{0.5}$, G$_2$SiO, GSiO$_{1.5}$, SiO$_2$, HG$_2$SiO$_{0.5}$, HGSiO and HSiO$_{1.5}$; each combination which defines a polymer contains at least one unit of the formula GSiO$_{1.5}$, SiO$_2$ or HSiO$_{1.5}$, but the units are so distributed that the average formula of each polymer is encompassed by the abovementioned average general formula. The viscosity of these polymers in general ranges from 2 to 4,000 cPo at 25° C.

Specific examples of suitable branched polymers having a well-defined structure and a low voscisity, are those corresponding to the following formulae:
CH$_3$Si[OSi(CH$_3$)$_2$H]$_3$, Si[OSi(CH$_3$)$_2$H]$_4$,
HSi[OSi(CH$_3$)$_3$][OSi(CH$_3$)$_2$H]$_2$,
  n.C$_3$H$_7$Si[OSi(CH$_3$)$_2$H]$_3$ and
Si[OSi(CH$_3$)(C$_2$H$_5$)H][OSi(CH$_3$)$_2$H]$_3$.

The platinum, used in an amount from 0.001 to 0.1 part, preferably 0.005 to 0.05 part, per 100 parts of diorganopolysiloxane polymers (A), is introduced into the compositions in the form of a complex (C). Examples of hydrocarbon radicals having from 1 to 8 carbon atoms which can form the symbols R and R' are alkyl radicals having from 1 to 4 carbon atoms (methyl, ethyl, propyl and butyl radicals), alkenyl radicals having only one double bond and from 2 to 4 carbon atoms, such as the vinyl, allyl and methallyl radicals, cycloaliphatic radicals having 5 or 6 ring carbon atoms such as the cyclopentyl, cyclohexyl, methylcyclopentyl and cyclohexenyl radicals, and aryl radicals having from 6 to 8 carbon atoms such as the phenyl, tolyl and xylyl radicals.

If two of the radicals R and R' together form a heterocyclic radical with the nitrogen atom, this heterocyclic radical generally contains 5 or 6 ring atoms, at most two of these atoms being hetero-atoms. Examples of such radicals, include the piperidino, morpholino, pyrrolidinyl, piperazinyl and dimethylpiperidino radicals.

These complexes can be prepared by bringing into contact one mol of platinous chloride with at least 2 mols of aminophosphine of the formula:

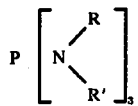

preferably in a diluent. A temperature from 70° C to 100° C generally favours the formation of these complexes. Details relating to the preparation of these complexes are given in French Patent No. 1,524,288.

It is to be understood that the complexes can be used directly in solution in the diluents in which they have been prepared, without being subjected to a subsequent purification. This is particularly advantageous if the amount of complex to be employed becomes large, for example several hundreds of grams; in particular, it makes it possible to avoid the purification stages such as isolation from the reaction medium and successive recrystallisations. No significant differences in the catalytic activity have been found between the purified complexes and the unpurified complexes.

Typical complexes which can be used include those having the formula:

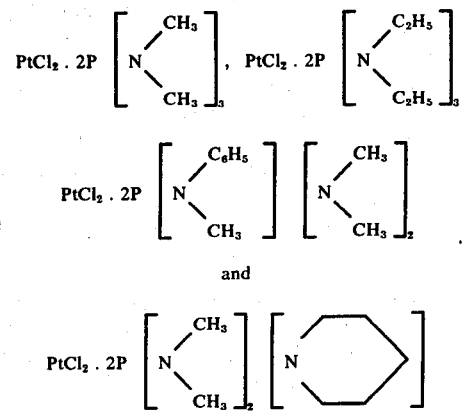

and

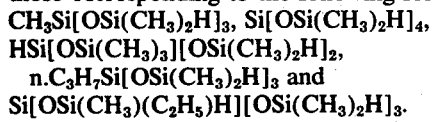

If the viscosity of the mixtures (A) does not exceed 3,000 cPo at 25° C the compositions can be prepared by simply mixing the constituents A, B and C at ambient temperature. In this case, the mixtures (A) should be selected from the mixtures (i) consisting of 60 to 100% of oily diorganopolysiloxane polymers (a) of viscosity from 10 cPo to 3,000 cPo at 25° C and 40 to 0% of diorganopolysiloxane oils (b) of viscosity ranging from 5 cPo to 500 cPo at 25° C; preferably, the oils (b) are blocked at each end of their chain by triorganosiloxyl groups.

However, it is possible to use polymers (a) [if these polymers do not constitute 100% of the mixtures (i)] of viscosity above 3,000 cPo at 25° C in view of the fact that this viscosity can be lowered by the introduction of suitable amounts of the oils (b).

The sequence of incorporation of the constituents (A), (B) and (C) is optional, but it is frequently more practical to mix (A) and (B) and then to add the complexes (C), which favours their miscibility. To facilitate handling and, subsequently, their dispersion; these complexes can be diluted beforehand in organic diluents to give concentrations not exceeding, say, 2%, for example 0.005 to 2%. Suitable organic diluents are chlorinated hydrocarbons, such as methylene chloride, chloroform and the various chloroethylenes and chloroethanes.

If the mixtures (A) have a viscosity greater than 3,000 cPo at 25° C the compositions should be diluted with the usual organic solvents. In this case the mixtures (A) are generally selected from the polymers (a) of viscosity greater than 3,000 cPo at 25° C or from mixtures (ii) consisting of 30 to 90% of the polymers (a) and 70 to 10% of the diorganopolysiloxane rubbers (c); in these mixtures (ii) the viscosity of the polymers (a) is generally greater than 3,000 cPo at 25° C, but this is not necessary if these polymers are combined with very viscous rubbers. The dilutions obtained make it possible easily to mix the constituents (A), (B) and (C) and, furthermore, subsequently facilitate the deposition of thin layers of the compositions on various supports.

It is advisable to use from 500 to 5,000 parts of solvents, preferably 800 to 4,500 parts, per 100 parts of the constituents (A). These solvents can be added directly to the mixtures of the constituents (A), (B) and (C), but it is advisable, in order to obtain homogeneous solutions more rapidly, to dissolve the mixtures (A) and (B) in a part, or in the whole, of the solvents, where relevant to add the rest of the solvents, and then to add the complexes (C). As indicated above, the latter can be used in the form of solutions in chlorinated hydrocarbons, which contain from, for example, 0.005 to 2% of the complexes.

The solvents which can be used include halogenated or non-halogenated alkanes and cycloalkanes, such as hexane, heptane, octane, dodecane, cyclopentane, cyclohexane, methylcyclohexane, petroleum cuts containing paraffin and/or cycloparaffin compounds, perchloroethylene, trichloroethylene and 1,2-dichloroethane, halogenated or non-halogenated aromatic hydrocarbons such as toluene, xylene, cumene, tetralin, chlorobenzene and orthodichlorobenzene, aliphatic ketones such as methyl ethyl ketone, methyl isopropyl ketone and methyl isobutyl ketone, and alkyl esters of monocarboxylic acids such as ethyl acetate and butyl acetate.

The compositions, whether diluted or not, are stable, when left in vessels open to the atmosphere, for at least 48 hours at temperatures which can be as high as 50° C. Thus they can be left in coating tanks for papercoating machines for several days at ambient temperature without it being necessary to discard the old non-used parts after only a few hours as has been necessary in the past.

The compositions as obtained, that is to say the undiluted compositions, can be applied to the selected cellulosic or synthetic material as substrate by means of devices suitable for uniformly depositing small amounts of liquids. For this purpose it is possible to use, for example, the so-called "Helio glissant" device which in particular comprises 2 superposed cylinders: the role of the lower cylinder, which dips into the coating tank containing the compositions, is to impregnate the upper cylinder with a very thin layer, whilst the role of the upper cylinder is to deposit on the paper (or other substrate) the desired amounts of the compositions with which it is to be impregnated, such metering being achieved by regulating the respective speeds of the two cylinders which rotate in opposite directions to one another.

The diluted compositions can be applied by means of the devices used on industrial paper-coating machines such as the gravure roll or the so-called "reverse roll" system. Once the compositions have been deposited on the supports, they can be cured within a few seconds by passing them through heated tunnel ovens at, say, 60° to 220° C, the time required for passage through these ovens generally varying from 2 to 30 seconds. For a given length of oven this depends on the speed at which the coated supports travel (and this can exceed 200 meters per minute); in general, a support of cellulosic materials travels more rapidly, for example at a speed of 3 m/second at a temperature above 140° C, than a support based on a plastics material. In effect, the latter cannot be subjected to the action of high temperatures and should thus be subjected to a lower temperature but for a longer period; for example, it will travel at a speed of 0.75 m/second at a temperature of the order of 80° C.

The amounts of the compositions deposited on the supports vary and most frequently range from 0.1 to 5 g/m² (undiluted composition) of treated surface. These amounts depend on the nature of the supports to be treated and on the desired non-stick properties. Thus the amounts deposited on non-porous supports such as highly refined papers treated with carboxymethylcellulose and sheets of plastics material are generally low and generally need not exceed 1.5 g/m²; in contrast, on porous supports it is necessary to deposit markedly higher amounts to achieve the same degree of non-stick behaviour, generally of the order of 1.2 to 2 g/m² if care is taken to select diorganopolysiloxane polymers (A) of high viscosity, for example $\alpha,\omega$-dihydroxydiorganopolysiloxane rubbers of viscosity 15 to 50 million cPo at 25° C.

The cured layers of the compositions impart, to the supports to which they are anchored, very good non-stick properties which last well. Furthermore, these cured layers are very rub-resistant; in particular they are not removed by abrasion when the coated supports pass over guide cylinders of coating machines or of adhesive applicators, which cylinders have a generally rough surface.

The compositions of the invention can be applied to materials which will subsequently be in contact with substances which release moisture. These cellulosic or synthetic, porous or non-porous, materials thus comprise the different varieties of paper, such as Kraft paper, which may be refined to any desired degree, glassine paper and imitation parchments, cardboards, vegetable parchment, papers coated with polyethylene or with carboxymethylcellulose, sheets of regenerated cellulose or of cellulose acetate, sheets of plastics such as polyethylene, polypropylene and polyethylene terephthalate, metal foils, fabrics based on synthetic fibres, glass or asbestos, and non-woven fibrous materials whether based on cellulosic fibres or synthetic fibres or a mixture of these fibres.

The materials which can be rendered non-stick by applying a composition of this invention can be used as, for example, interlayers, release supports, papers and films for transfers and packaging of (1) sticky materials such as confectionery, pastry, raw rubbers, pitches and bitumens, and waxes, or (2) foodstuffs which release moisture such as fish, meat and cheese.

The compositions according to this invention are more especially of value in coating both faces of adhesive-protecting supports of which one of the two faces will subsequently receive a layer of adhesive, which layer is deposited by means of a small partitioned adhesive-coating machine equipped with a plurality of guide cylinders. The supports which have been adhesive-coated in this way and wound up for storage, generally unwind easily at the time of use, the lower face treated with the compositions having resistance to wear due to rubbing during its travel over the guide cylinders. Furthermore, the layer of adhesive detaches easily from the support and can therefore easily be applied to the materials to be glued.

The following Examples further illustrate the present invention.

EXAMPLE 1

A treatment bath is prepared in accordance with the method given below, by mixing the following ingredients: 158 parts of an $\alpha,\omega$-bis(trimethylsiloxy)dimethylpolysiloxane rubber of viscosity 50 million cPo at 25° C, 130 parts of an $\alpha,\omega$-di(hydroxy)dimethylpolysiloxane oil of viscosity 1 million cPo at 25° C, 12 parts of an $\alpha,\omega$-di(hydroxy)dimethylpolysiloxane oil of viscosity 50 cPo at 25° C, 10 parts of a methylhydrogenopolysiloxane polymer of average formula $(CH_3)_3Si[OSiH(CH_3)]_{45}OSi(CH_3)_3$ and viscosity about 22 cPo at 25° C, 3,700 parts of a petroleum cut taken between 93° C and 114° C and consisting principally of paraffin hydrocarbons and 20 parts of an 0.5% solution of the complex of the formula $PtCl_2.2P[N(CH_3)_2]_3$ in trichloroethylene (representing about 0.033 part of platinum).

The rubber and the two $\alpha,\omega$-di(hydroxy)dimethylpolysiloxane oils are dissolved in the petroleum cut and the methylhydrogenopolysiloxane polymer is then added to the solution obtained; after stirring for a few minutes, a homogeneous mixture is formed, into which the solution of the platinum complex is finally introduced.

This bath is divided into two substantially equal fractions A' and B', the fraction (B') is left in a vessel open to the atmosphere (the relative humidity being about 50% and the temperature 20° C) and the fraction (A') is immediately deposited, at the rate of 10 g/m², on the face, covered with a carboxymethylcellulose barrier layer, of a Kraft paper weighing 80 g/m². This paper, prepared from a pulp refined to 64° Shopper, is coated beforehand with the abovementioned barrier layer with the intention of increasing its solvent resistance.

The coating from the bath is carried out by means of a Mayer levelling bar mounted on an industrial paper-coating machine. The layer deposited is simultaneously dried and cured by passing the coated paper at a speed of 200 m/minute through a tunnel oven heat to 200° C, the time of travel of the paper through the oven being 5 seconds.

A strip 5 cm wide and about 21 cm long is cut from the paper treated in this way and is placed on a steel cylinder of 9 cm diameter and 15 cm length, the silicone-coated face of the strip being in direct contact with the cylinder. This strip is then placed under tension by attaching a weight (685 g) to one of its ends and placing the other end in the jaws of a flat gripper located parallel to the axis of the cylinder; the length of the strip in contact with the cylinder is 10 cm. The cylinder is caused to move at a speed of 32 revolutions per minute; after 2 minutes' rubbing the paper is removed and its surface which has been subjected to rubbing (about 50 cm²) is washed with ethanol.

After drying in air, this surface is moistened with a piece of cotton fabric impregnated with water coloured by red ink; it is found that no red stain whatsoever (an indication of the penetration of the water into the paper) is visible and the coloured water is solely spread over the treated surface in the form of a multitude of small drops; the layer of cured silicone on the paper has thus not been removed by rubbing.

A similar test is now carried out with the fraction (B') of the bath which has been left exposed to the atmosphere for 4 days; it is found that the cured silicone layer, anchored to the carboxymethylcellulose-covered face of a Kraft paper identical to the above paper, has the same properties as the layer formed from fraction (A'). The bath can thus be left exposed to the atmosphere for at least 4 days without undergoing a decrease in its activity.

An adhesive tape of the Sparadra type is applied to the face of the papers which have been treated with the fractions A' and B' and have therefore been coated with a layer of cured silicone, for 24 hours under a pressure of 70 g/cm²; the force required to detach the tape from the papers is then measured. To carry out this measurement, one end of the adhesive tape is folded 180° and a force is then applied to its end via a tensometer so as to cause the tape to detach at a speed of 25 cm/minute. For all the papers, the force required for detachment is only 2 g for a tape width of 1 cm and hence the non-stick character resulting from the presence of the silicone layer is excellent.

EXAMPLE 2

The following ingredients are used to prepare a treatment bath: 291 parts of a rubbery mixture (prepared as described at the end of this Example) of dimethylpolysiloxane polymers, of William plasticity 120, and containing 0.007% of hydroxyl groups linked to the silicon atoms, 9 parts of a methylhydrogenopolysiloxane polymer of the formula $(CH_3)_3Si[OSi(CH_3)_{2 1-3}[OSi(CH_3)H]_{59}OSi(CH_3)_3$, of viscosity 36 cPo at 25° C, 700 parts of xylene, 3,000 parts of methylcyclohexane and 30 parts of an 0.5% solution of the complex of the formula $PtCl_2.2P[N(C_2H_5)_2]_3$ in chloroform (representing about 0.038 part of platinum).

The rubbery mixture and the methylhydrogenopolysiloxane copolymer are first of all dissolved in the xylene and the methylcyclohexane is then added to this solution; after stirring for a few minutes, a homogeneous mixture is obtained into which the solution of the complex based on platinum is run.

This bath is divided into two substantially equal fractions $A_1$ and $B_1$.

The fraction ($B_1$) is left in a vessel open to the atmosphere (relative humidity being about 50% and the temperature 20° C). The fraction ($A_1$) is immediately deposited, at the rate of 5 g/m², on the face, covered with a film of polyethylene of substantially 15 microns thickness, of a bleached Kraft paper produced from a nonrefined pulp.

The coating from the bath is carried out using a gravure roll mounted on an industrial paper-coating machine. The layer deposited is dried and cured by passing the coated paper at a speed of 60 m/minute through a tunnel oven heated to 110° C, the time of travel through the oven being 15 seconds.

To measure the rub resistance of the cured silicone layer, the rubbing test described in Example 1 is used: the paper, in the form of a 5 cm wide strip, is brought into contact, with its silicone-coated face, with the steel cylinder for a period of 2 minutes. An adhesive type of the Sparadra type is applied to the surface which has been subjected to the rubbing, in the manner described in Example 1. The force required for detachment, measured by means of the tensometer, amounts to 4 g for a 1 cm wide tape. An identical adhesion measurement is carried out on the coated face of the paper which has not been subjected to rubbing: the force required for detachment is 3 g/cm; it appears from these measurements that the rubbing has scarcely affected the silicone layer.

The face, covered with a film of polyethylene, of a bleached Kraft paper identical to the preceding paper is treated with the fraction ($B_1$) which has been left for 3 days at ambient temperature. The method of treatment is that used for fraction ($A_1$); after carrying out the same rubbing test, the force required for detachment of the adhesive tape (the tape being applied to the surface which has been subjected to the rubbing) is measured; it amounts to 4 g/cm. The silicone layer has thus effectively resisted the abrasion caused by the rubbing of the steel cylinder.

The rubbery mixture is prepared in the following manner: 1,000 g of octamethylcyclotetrasiloxane are introduced into a 2 $l$ flask protected from the atmosphere by passing a stream of dry nitrogen through it; the contents of the flask are heated to 160° C and 10 mg of potassium hydroxide are then added, after which the temperature of 160° C is maintained for 30 minutes. At the end of this period, the mixture has the appearance of a rubber.

40 mg of water are introduced into the flask and the heating at 160° C is then continued for 3 hours; 30 minutes before the end of this heating, the stream of dry nitrogen is replaced, only for a period of 10 minutes, by a stream of moist nitrogen. At the end of the 3 hours' heating, the rubbery mixture is neutralised by introducing carbon dioxide gas into the flask; after cooling, the mixture is left at ambient temperature in a closed vessel.

EXAMPLE 3

96 parts of an $\alpha,\omega$-di(hydroxy)dimethylpolysiloxane oil, of viscosity 500 cPo at 25° C, and 4 parts of a methylhydrogenopolysiloxane polymer of the formula $(CH_3)_3Si[OSiH(CH_3)]_{45}OSi(CH_3)_3$ and of viscosity 22 cPo at 25° C are introduced into a flask equipped with a stirring device. After a homogeneous mixture has been obtained, 7.5 parts of a solution containing 0.5% of the complex of the formula $PtCl_2.2P[N(CH_3)_2]_3$ in trichloroethylene (representing about 0.0126 part of platinum) are added.

This composition is divided into two substantially equal fractions $A_2$ and $B_2$. The fraction $(B_2)$ is left in a vessel open to the atmosphere (the relative humidity being about 50% and the temperature 20° C). The fraction $(A_2)$ is immediately deposited, at the rate of 0.9 g/m², on the face, covered with a carboxymethylcellulose barrier layer, of the Kraft paper used in Example 1. The deposition is effected by means of the so-called "Helio glissant" device, mounted on an industrial paper-coating machine.

The layer of silicone deposited is cured by passing the coated paper, at a speed of 180 m/minute, through a tunnel oven heated to 160° C, the time of travel through the oven being 9 seconds.

A strip 5 cm wide and about 21 cm long is cut from this paper; the resistance to rubbing of the silicone-coated face of this strip is measured by means of the device described in Example 1. After this face has been subjected to the abrasive action of the steel cylinder for 2 minutes, it is cleaned with alcohol and then moistened, as described in Example 1, by means of a piece of cotton fabric impregnated with water coloured red.

It is found that there are no coloured stains visible on the surface of the paper, the water solely being dispersed over the silicone-coated face in the form of strings of small drops; thus the silicone-coated face has resisted the abrasion perfectly.

An analogous test on the treatment of a Kraft paper, identical to the preceding Kraft paper and having the same carboxymethylcellulose barrier layer on one face, is carried out with the fraction ($B_2$) after it has been left for 4 days at ambient temperature. In the rubbing test, it is found that the treated face of the paper has substantially the same characteristics as that treated with fraction ($A_2$).

EXAMPLE 4

77 parts of an $\alpha,\omega$-di(hydroxy)dimethylpolysiloxane oil of viscosity 750 cPo at 25° C, 19 parts of an $\alpha,\omega$-bis-(trimethylsiloxy)dimethylpolysiloxane oil of viscosity 20 cPo at 25° C and 4 parts of a methylhydrogenopolysiloxane polymer of the average general formula $(CH_3)_3Si[OSi(CH_3)H]_{39}OSi(CH_3)_3$ of viscosity 19 cPo at 25° C are introduced into a flask equipped with a stirring device. The whole is stirred for 10 minutes; 7.5 parts of a solution (the preparation of which is described below) containing 1.05% by weight of the complex of the formula $PtCl_2.2P[N(CH_3)_2]_3$ in 1,2-dichloroethane, representing about 0.0261 part of platinum, are then introduced into the homogeneous mixture obtained.

This composition is divided into two substantially equal fractions $A_3$ and $B_3$. The fraction $B_3$ is introduced into a vessel open to the atmosphere and the vessel is then placed in a thermostatic bath heated to 25° C. The fraction $A_3$ is immediately deposited, at the rate of 1 g/m² on the face of a Kraft paper (prepared from a pulp refined to 64° Shopper) weighing 80 g/m², this face having beforehand been covered with a barrier layer consisting of a mixture of carboxymethylcellulose and starch. The deposition is carried out by means of the so-called "Helio glissant" device, mounted on an industrial paper-coating machine.

The layer of silicone deposited is cured by passing the coated paper at a speed of 70 m/minute through a tunnel oven heated to 200° C, the time of travel through the oven being 8 seconds.

60 g/m² of a solution of an adhesive (namely an acrylic polymer sold under the trademark "Soluron A 1030 E", as a 40% solution in ethyl acetate) are deposited, by means of a casting device, on the face of the paper which is now covered with a cured layer of silicone. The whole is placed in an air circulation oven, heated to 130° C, for 3 minutes and is then left for 5 minutes at ambient temperature. This results in the deposition, on the silicon-coated face of the paper, of a uniform layer of adhesive in an amount of 24 g/m².

A film of polyethylene terephthalate is applied to this layer of adhesive and is kept in position for 24 hours under a pressure of 24 g/cm². At the end of this period of time, the force required to detach the film (of polyethylene terephthalate) from the paper is measured; this measurement is carried out by means of a tensometer, following the process described at the end of Example 1. It is found that the force required for detachment is 15 g for a film width of 1 cm.

An analogous test is carried out with the fraction $B_3$ which is kept for 2 days (in a vessel open to the atmosphere) at a temperature of 25° C. It is found (after depositing the layer of adhesive on the silicone-coated face of the paper), in carrying out the test for detachment from the polyethylene terephthalate film, that the force required for detachment is 18 g for a film width of 1 cm.

By way of comparison a composition similar to that which has just been described is prepared by mixing the same starting constituents except that the 7.5 parts of the solution containing 1.05% by weight of the $PtCl_2.2P[N(CH_3)_2]_3$ complex are replaced by 2.9 parts of a solution containing 2% by weight of the complex $PtCl_2.2S(C_2H_5)_2$ in toluene (also representing 0.0261 part of platinum). This solution, containing 2% by weight of the complex, is described in Example 1 of French Application No. 2,183,126.

This composition is treated in the same way as the composition containing the $PtCl_2.2P[N(CH_3)_2]_3$ complex: it is divided into two fractions, of which one is kept at 25° C and the other is used immediately, a Kraft paper is coated, the coating is cured in the tunnel oven, the acrylic adhesive is deposited on the silicone-coated face of the paper and the force required for detachment is measured.

With the fraction used immediately it is found that the force required for detachment is 14 g for a 1 cm width of the polyethylene terephthalate film; in contrast, the fraction kept at 25° C cannot be used for coating the Kraft paper; in effect, it has gelled completely after having been left for only 4 hours at this temperature.

The solution containing 1.05% by weight of the complex $PtCl_2.2P[N(CH_3)_2]_3$ is prepared as indicated below: a dispersion of 13.3 g of platinous chloride in 75 cm$^3$ of 1,2-dichloroethane is heated to 75° C and once this temperature has been reached the heating is discontinued and a solution of 16.3 g of the phosphine $P[N(CH_3)_2]_3$ in 35 cm$^3$ of 1,2-dichloroethane is run in over a period of 10 minutes; the resulting mixture is stirred for 15 minutes at a temperature of 75° C and is then diluted by adding 2,652 g of 1,2-dichloroethane.

We claim:
1. An organosilicon composition which contains the following:
   A. 100 parts by weight of a polymer mixture which is selected from:
   i. a mixture containing about 60 to 100% by weight of a diorganopolysiloxane polymer with terminal hydroxyl groups (a), having a viscosity at least about 10 cPo at 25° C, and about 40 to 0% by weight of a diorganopolysiloxane oil (b) blocked at one chain end of their chain by a triorganosiloxyl unit and at the other end by a triorganosiloxyl unit or a hydroxyl group, having a viscosity from about 5 cPo to about 500 cPo at 25° C, and
   (ii) a mixture containing about 30 to 90% by weight of a diorganopolysiloxane polymer (a) as defined above and about 70 to 10% by weight of a diorganopolysiloxane rubber (c) blocked at each chain end by a triorganosiloxyl unit, having a viscosity of at least about 1 million cPo at 25° C, the organic radicals linked to the silicon atoms of the said diorganopolysiloxanes described under (i) and (ii) being selected from methyl, vinyl, ethyl and n-propyl radicals such that at least about 80% of them are methyl radicals and at most about 3% of them are vinyl radicals and such that there is only a single vinyl radical linked to a silicon atom;
   B. about 1 to 15 parts by weight of an organohydrogenopolysiloxane polymer (d) corresponding to the general formula:

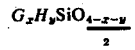

in which the symbol G represents a methyl, ethyl or n-propyl radical such that at least about 80% of the G radicals are methyl radicals, the symbol $x$ represents a number from 1 to 1.99 and the symbol $y$ represents a number from 0.1 to 1, the sum $x + y$ being from 1.7 to 2.6, and the viscosity being from about 2 cPo to about 4,000 cPo at 25° C;
   C. about 0.001 to 0.1 part by weight of platinum in the form of a platinous chloride phosphorus derivative complex of the general formula:

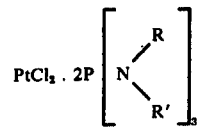

in which the symbols R and R', which may be identical or different, each represents a monovalent hydrocarbon radical having from 1 to 8 carbon atoms, or two of these radicals, together with the nitrogen atom to which they are attached, form a monovalent heterocyclic radical.

2. A composition according to claim 1, in which the complex C corresponds to the formula:

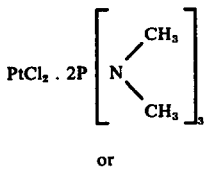

or

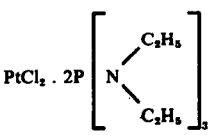

3. A composition according to claim 1 in which the complex is present as a solution in the diluent in which it has been prepared.

4. A composition according to claim 1 in which the mixture (i) consists of about 60 to 100% by weight of oily diorganopolysiloxane polymer (a) of viscosity from about 10 to about 3,000 cPo at 25° C and of about 40 to 0% by weight of diorganopolysiloxane oil (b) blocked at each chain end by a triorganosiloxyl unit.

5. A composition according to claim 1 in which the organohydrogenopolysiloxane polymer (d) is a methylhydrogenopolysiloxane.

6. A composition according to claim 1 in which component C is present in an amount from about 0.005 to 0.05 part by weight per 100 parts of component A.

7. Process for the preparation of a composition as defined in claim 1 which comprises mixing components A, B and C at ambient temperature.

8. A method of coating a cellulosic or synthetic material which comprises applying thereto a composition as defined in claim 1.

* * * * *

UNITED STATES PATENT AND TRADEMARK OFFICE
CERTIFICATE OF CORRECTION

PATENT NO. : 4,028,298
DATED : June 7, 1977
INVENTOR(S) : Jean DUMOULIN et al

It is certified that error appears in the above-identified patent and that said Letters Patent are hereby corrected as shown below:

Under the heading "Foreign Application Priority Data", before the existing data, please insert --September 3, 1974  France ....... 74.29962--.

Signed and Sealed this

*Twenty-eighth* Day of *November 1978*

[SEAL]

Attest:

RUTH C. MASON
*Attesting Officer*

DONALD W. BANNER
*Commissioner of Patents and Trademarks*